Sept. 14, 1937.  E. L. VOGT  2,092,994
COMBINED PIPE JOINT AND SEWER STOP
Filed Sept. 27, 1934  2 Sheets-Sheet 1
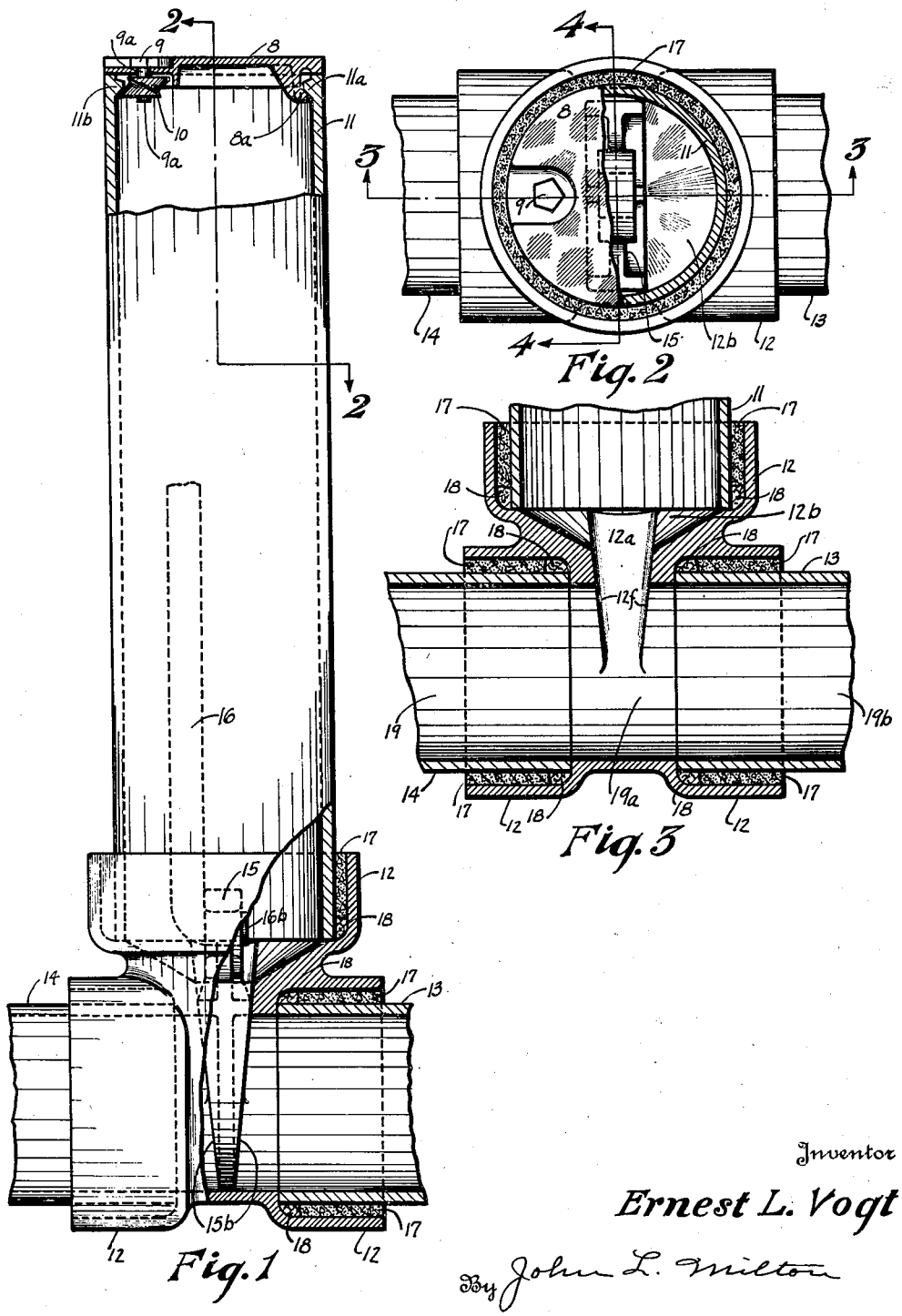
Inventor
Ernest L. Vogt
By John L. Milton
Attorney Sept. 14, 1937.    E. L. VOGT    2,092,994
COMBINED PIPE JOINT AND SEWER STOP
Filed Sept. 27, 1934    2 Sheets-Sheet 2
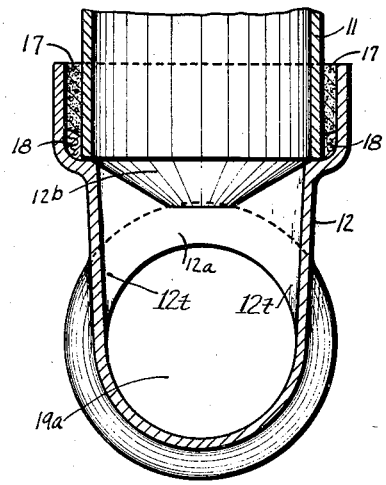
Fig. 4
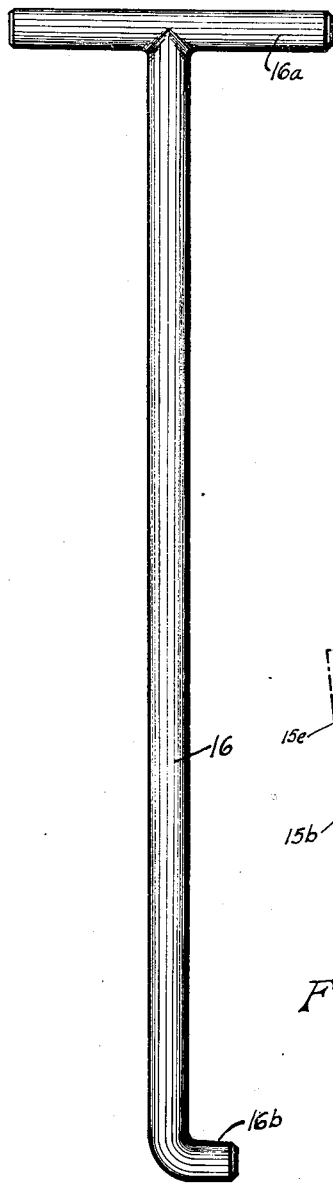
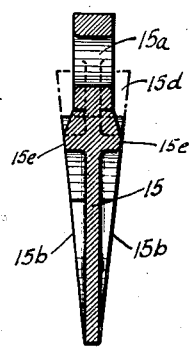
Fig. 6
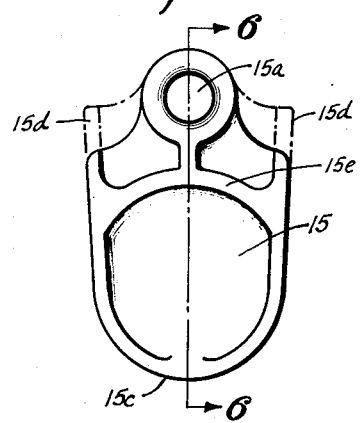
Fig. 5
Fig. 7
Inventor
Ernest L. Vogt
By John L. Mieton
Attorney Patented Sept. 14, 1937

2,092,994

UNITED STATES PATENT OFFICE 2,092,994

COMBINED PIPE JOINT AND SEWER STOP

Ernest L. Vogt, Louisville, Ky.

Application September 27, 1934, Serial No. 745,805

1 Claim. (Cl. 251—51)

The object of my invention is to provide a pipe joint construction for conduits, which permits immediate access to the interior of the conduit, whereby a portable wedge or stop member may be inserted therein to stop the flow of materials such as liquids or solid particles through the pipe joint body.

Another object of my invention is to provide a construction which eliminates all objectionable recesses or projections within the fluid passage which would tend to obstruct the normal flow of material therethrough.

A further object of my invention is to provide a construction in which all guide surfaces for supporting the wedge or stop member in sealing position, are placed external of the fluid passage.

A still further object of my invention is to provide a construction which eliminates all machine work or gasket sealed members to produce an effective stop in the flow of materials.

And a still further object of my invention is to provide a pipe joint construction which facilitates the installation of a "standpipe" or chamber communicating with the ground level and stop opening of the pipe joint body whereby immediate access to the opening, or wedge lodged therein, may be had when desired.

In order to limit access to the opening or wedge, it is the object of my invention to provide a removable cover for the "standpipe" or chamber which is secured thereto by any suitable locking means.

With these objects in view, the invention consists in a construction and combination of parts of which a preferred embodiment is illustrated in the accompanying drawings, wherein:

Figure 1 is an elevational view illustrating a part of my pipe joint in section; and which further shows connecting conduits secured in place. Figure 1 further indicates my removable wedge inserted in place and the means for removing the wedge from the fluid passage. The upper end of the "standpipe" or chamber has been illustrated in section to show one embodiment of a locking means therefor.

Fig. 2 is a horizontal view of Fig. 1 partially illustrated in section as indicated by lines 2—2 of Fig. 1.

Fig. 3 is a vertical section along the line 3—3 of Fig. 2, in which only a part of the "standpipe" is illustrated, and which further illustrates the wedge removed.

Fig. 4 is a vertical section along the line 4—4 of Fig. 2 in which only a part of the "standpipe" is illustrated, and which likewise illustrates the wedge removed.

Fig. 5 is an elevational view of the portable wedge illustrated lodged in place in Fig. 1.

Fig. 6 is a vertical section along line 6—6 of Fig. 5.

Fig. 7 is an elevational view illustrating the tool employed to lodge and remove the wedge as indicated in Fig. 1.

The invention is carried into effect by providing a pipe joint body member 12, which from all external appearances resembles a pipe joint commonly referred to as a T. From the conventional T, the interior of my body member 12 provides this distinction; into the opening, which extends transversely from the longitudinal openings of the T, is fashioned a guideway 12a for receiving a removable wedge or "stop member 15". Referring in particular to Figs. 2, 3 and 4 it will be noted that guideway 12a assumes a rectangular shaped opening in the horizontal plane, which in the vertical plane is connected by tapering surfaces 12f extending into the fluid passage 19a. It is likewise important to note that guideway 12a intersects but one half of the fluid passage 19a, and that the end surfaces 12t thereof are tangent to the bore of the fluid passage 19a. Referring further to Figs. 3 and 4, it will be noted that the rectangular opening, which defines the upper portion of guideway 12a, employs inclined surfaces 12b to communicate with a circular vertical opening of the body member. These inclined surfaces 12b preferably define a "frusto-conical" section, the purpose of which will be dealt with in detail hereinafter.

The elevational section shown in Fig. 3 and taken along line 3—3 of Fig. 2 indicates one preferred method of securing conduits 13 and 14 to the main body member 12. These conduits 13 and 14 may be of tile or any suitable metallic pipe, and which, as illustrated, are inserted in the main body portion so that the fluid passage 19a of the pipe joint body 12 registers with the fluid passages 19 and 19b of the respective conduits. In assembly, these conduits 13 and 14 are located and sealed by jute 18 or other suitable packing material, the joint being further completed by the packing of cement 17 or its equivalent between the conduit bodies and the pipe joint 12. A vertical standpipe or communicating chamber 11 is secured to the vertical opening of the pipe joint body 12 in a similar manner. However, I am aware that many other suitable forms of attaching conduits thereto may be employed without departing from the spirit of my invention, such as threaded pipe joints or flanged pipe joints as may be desired for the particular service to which it is applied. The guideway 12a, referred to hereinbefore for admitting and locating the wedge member 15 in the fluid passage 19a, is provided with inclined surfaces 12f which are fashioned to substantially register with the corresponding tapering faces 15b of the wedge member. The guideway 12a, as clearly indicated in Fig. 4, intersects but the upper half of the bore of the fluid passage 19a and thus eliminates any recesses or projections on the lower half of the fluid passage 19a which may tend to interfere with the normal flow of material therethrough or which may become clogged by settling particles and thus prevent the proper lodging of the stop member 15 in the fluid passage 19a. This feature provides a marked advance in the construction of devices which may be utilized to effect stoppage in the flow of material. Thus the salient feature of my combined pipe joint and stop unit, is the provision of a smooth wall surface at the bottom of the fluid passage 19a. Since in certain applications materials may rise into the vertical standpipe while the wedge 15 is removed, inclined surfaces 12b, which communicate with the interior opening of the standpipe 11b and the guideway portion 12a, are fashioned to prevent the lodging of material within the standpipe after normal flow has been reestablished through the conduits. These inclined surfaces 12b likewise serve to direct wedge 15 into the guideway 12a thereby greatly facilitating the entrance of the wedge into the guideway.

Figs. 5 and 6 deal principally with the construction of the wedge or stop member 15. As illustrated, member 15 consists principally of a main body web, provided with opposed inclined surfaces 15b and opposed arcuate surfaces 15e which register with the inclined surfaces 12f of the guide member 12a. The upper portion of the wedge is provided with an opening 15a and so located with respect to the inclined surfaces 15b, that it will always remain within the vertical standpipe 11 when the wedge is properly located in the guideway 12a. The outer edge 15c of the wedge is fashioned so as to conform with the contour of the fluid passage and the tangent projections 12t forming the end surfaces of opening 12a. The solid lines in Figs. 5 and 6 illustrate a preferred shape my wedge assumes in one embodiment of my invention, while the dot-dash lines indicate extensions of the surfaces 15b and 15c to increase the area of contact between the wedge 15 and the guideway 12a.

Referring again to Fig. 1, it will be noted that the outer opening of standpipe 11 is provided with a removable cover member 8. Within the interior of the standpipe 11 are formed projections 11a and 11b, projection 11a being adapted to be embraced by a projection 8a of cover member 8. Diametrically opposite these engaged members, is located an eccentric cam 10 which essentially consists of a single turn of a coarse worm type screw. The eccentric cam member 10 is rigidly secured to the round member 9a which in turn is loosely fitted in the cover member 8. The upper end of member 9a is fashioned with a pentagon head 9, which necessitates the use of a special wrench in order to rotate the eccentric cam 10 into or out of engagement with the projection 11b. When access to the interior of standpipe 11 is desired, the special pentagon wrench is applied to the head 9 and rotated until the eccentric cam member 10 disengages projection 11b, whereupon cover 8 may be completely removed. While this method of securing the cover member 8 to standpipe 11 is illustrated as a preferred arrangement, I am aware that other forms of locking devices may be employed without departing from the spirit of my invention.

Fig. 7 illustrates the particular form of tool which is employed to remove the wedge 15 from the fluid passage. This tool consists of a rod 16 fashioned at its lower end with a hook 16b while its upper end is fashioned with a handle or suitable gripping means indicated as 16a. In Fig. 1 the hook portion 16b is illustrated as engaging the hole 15a of the wedge member 15. Normally the tool 16 does not form a part of my assembly, and is preferably of such length so as to prevent application of the cover member 8 as long as tool 16 remains in the standpipe 11. It is likewise evident that tool 16 is similarly employed to insert the wedge 15 in the guideway portion 12a. As hereinbefore mentioned, wedge member 15 does not normally form a part of my pipe joint, but is assembled therewith only when stoppage in the flow through the fluid passage 19a is desired. While in a preferred embodiment of my invention it is desired to completely remove the wedge 15 and the tool 16 from standpipe 11, when same are not in use, it will be evident to those versed in the art that tool 16 may be of such length so as to permit same to be normally sealed within the standpipe. Similarly I have fashioned wedge 15 so that same can be normally retained within the standpipe 11 by placing the wedge at right angles to the guideway portion 12a.

One application of my combined pipe joint and stop is for those locations where it is desirable to discontinue the flow of sewage through conduits 13—14 at various seasons of the year, for such reasons as directing the flow of sewage to some other destination, repairs, etc. It should be clearly understood that the combined pipe joint and stop unit herein illustrated, described, and claimed, has a wide and varied application to conduits conveying most any fluid substance or solid particles therein, and wherein it may be desired to discontinue the flow thereof. For illustrative purposes, the invention has been designated as being applied to a sewer conduit but it will be clear that the same is equally applicable to irrigation conduits, oil lines, conduits communicating with grain elevators, and many other conduit connecting systems wherein it is desirable to employ a simple and inexpensive unit for discontinuing the flow of materials therein. Therefore I do not wish to limit myself to any specific use, or to the exact form herein shown and described other than by the appended claim.

I claim:

A pipe joint body characterized by an external construction resembling a pipe joint T and comprising a smooth cylindrical fluid passage connecting the longitudinally opposed openings of said T body except as intersected by a rectangular opening fashioned in the upper half of said cylindrical passage, the sides of said rectangular opening being connected by wall members that angularly project from the periphery of said cylindrical passage and terminate within the angularly disposed opening of said T body; a wedge shape gate member adapted to be inserted through said rectangular opening; the end wall members connecting the shorter sides of said rectangular opening being tangent to the bore of said cylindrical passage at substantially diametrically opposite points and extended upwardly to an elevation above the upper half of said cylindrical passage to form relatively long guide surfaces for locating said wedge shaped gate member, the wall members connecting the longer sides of said rectangular opening being substantially flat and fashioned to join said end wall members throughout their upright length to provide the sole lateral support for said gate member externally of the fluid passage, said wedge shaped gate member being constructed and arranged to register substantially with the wall members connecting said rectangular opening and the contour of the lower half of said cylindrical fluid passage whereby said gate member is located and supported entirely by said wall members so as to arrest the flow of material through said fluid passage.

ERNEST L. VOGT.